United States Patent
Ghosh et al.

[11] Patent Number: 6,114,267
[45] Date of Patent: Sep. 5, 2000

[54] PROCESS FOR THE PREPARATION OF FLUIDIZED CATALYTIC CRACKING (FCC) CATALYST

[76] Inventors: Sobhan Ghosh, House No 144, Faridabad; Satish Makhija, 1174, Sector A, Pocket A Vasant Kunj, New Delhi; Mohan Prabhu Kuvettu, House No 55A, Sector IIC, DLF Model Town; Ventachalam Krishnan, House No 406, Sector 8, both of Faridabad; Sanjay Kumar Ray, 112 Tagore Hostel, New Delhi-110002; Manoranjan Santra, House No. 818, Sector 8, Faridabad-121006; Ram Mohan Thakur, House No 1676, Sector-8, Faridabad-121006; Jagdev Kumar Dixit, House No. 923, Sector 8, Faridabad 121006, all of India

[21] Appl. No.: 09/080,201

[22] Filed: May 18, 1998

[51] Int. Cl.[7] ..................... B01J 29/06
[52] U.S. Cl. ............... 502/68; 502/64; 502/65; 502/73; 502/79; 502/85; 502/86
[58] Field of Search ............... 502/64, 65, 68, 502/73, 79, 85, 86

[56] References Cited

U.S. PATENT DOCUMENTS

| | | | |
|---|---|---|---|
| 4,325,847 | 4/1982 | Lim et al. | 502/68 |
| 4,476,239 | 10/1984 | Chiang et al. | 502/68 |
| 4,588,496 | 5/1986 | Scherzer | 208/120 |
| 4,711,864 | 12/1987 | Pellet et al. | 502/65 |
| 5,082,815 | 1/1992 | Macedo | 502/68 |
| 5,173,463 | 12/1992 | Macedo | 502/68 |
| 5,464,527 | 11/1995 | Ward | 208/111 |
| 5,807,474 | 9/1998 | Balai et al. | 208/120 |

*Primary Examiner*—Tom Dunn
*Attorney, Agent, or Firm*—Venable; George H. Spencer; Charles C. Rories

[57] ABSTRACT

A process for preparation of fluidized catalytic cracking (FCC) catalyst, comprising silicon stabilized large crystallite sized synthetic faujasite zeolite, aluminum depleted and normal kaolin clay, alumina and silica. The cracking catalyst is highly active and selective for bottom upgradation, it produces less coke and higher gasoline and total cycle oil (TCO) and possesses improved metal tolerance properties when evaluated and compared with a commercial catalyst under conditions of a typical FCC unit in a petroleum refinery.

14 Claims, No Drawings

PROCESS FOR THE PREPARATION OF FLUIDIZED CATALYTIC CRACKING (FCC) CATALYST

FIELD OF THE INVENTION

The present invention relates to a process for the preparation of a catalyst for hydrocarbon conversion and particularly the fluidized catalytic cracking of high vacuum gas oil feedstocks.

BACKGROUND OF THE INVENTION

FCC is a major secondary refining process and the FCC catalyst used in such a process provides considerable flexibility to refiners to meet the required product slates. To improve the efficiency of this process it is desired to upgrade the bottom products (boiling above 370° C.) to more valuable lighter products and less coke (due to regenerator hardware limitations). In this endeavor, not much emphasis is given in the prior art processes of FCC catalyst development.

Preparation of FCC catalyst is generally accomplished by admixing Y type zeolite, normal kaolin clay and suitable binders to produce a slurry. The aqueous slurry is then subjected to agitation for uniform dispersion of individual components and spray dried to form dry catalyst microspheres.

Typical prior art catalyst preparation procedure involves use of sodium silicate as silica source, aluminum sulfate, Y type zeolite, kaolin clay and suitable acid to convert sodium silicate to silica sol binder. However, such a process involves repeated washing off of sodium sulfate by product and subsequent exchange of sodium of the zeolite. This process is time consuming, hardware intensive and requires considerable quantities of demineralised (DM) Water and there is a need for effluent treatment facility. U.S. Pat. No. 4,142,995 mentions use of silica-alumina gel in catalyst formulation for improving catalyst activity and attrition resistance. However, this process has not addressed the issue of selectivity improvements like reduction of bottom and coke and enhancement of TCO and gasoline yields. It is known that preparation of silica-alumina gel is time consuming and requires several washings.

From an efficiency and economy point of view it is generally preferred to use ingredients with low soda content i.e., binder, zeolite, matrix etc. to avoid series of washing steps. U.S. Pat. No. 4,443,553 teaches preparation of FCC catalyst using soda free raw materials, wherein aluminum hydroxy chloride is used as viscosity reducing agent. The process suffers from the disadvantage that chlorine evolved during the preparation procedure is corrosive and poses problems for the hardware and environment as well. Performance of the catalyst is not part of claims of the said patent. In addition to the above, presence of chlorine is likely to interfere with the efficiency of catalytic cracking.

U.S. Pat. No. 4,086,187 describes use of ammonium polysilicate and alumina to provide catalyst with improved attrition resistance and pore volume. However the catalyst has not been subjected to detailed performance testing.

While the prior art describes different methods of formulating cracking catalyst often requiring high investments, catalysts are not able to meet the desired product requirements. Thus, there is a requirement for a catalyst which provides not only an acceptable degree of physical properties and activity but also the most desirable selectivity like enhanced gasoline and TCO yields while reducing undesirable bottom and coke products. Development of bottom and coke selective catalyst becomes more relevant for low severity FCC unit operations prevalent in many countries like India.

Prior art processes demonstrate the performance of the steamed catalyst by means of ASTM Micro Activity Test (MAT), where the feed injection time is very large leading to highly non-isothermal reaction conditions. The feed used is different than that used in commercial FCC units and only a particular catalyst to oil ratio is employed. The product selectivity depends on these parameters and ASTM MAT is not suitable for predicting performance of the catalyst in a commercial FCC unit. To overcome this difficulty and to correctly predict catalyst performance in a commercial FCC unit, in the present invention a commercial high vacuum gas oil feedstock is used to evaluate the catalyst at different catalyst to oil ratios at contact times much lower than the conventional ASTM MAT conditions.

OBJECTS OF THE PRESENT INVENTION

An object of the present invention is to propose a process for the preparation of a novel FCC catalyst useful for the conversion of petroleum hydrocarbons.

Another object of this invention is to propose a method for preparation of silicon stabliized large crystallite sized synthetic faujasite zeolite suitable for incorporation in FCC catalyst formulation.

Yet another object is to propose a method for preparing aluminum kaolin clay which could be incorporated in the FCC catalyst formulation.

A further object of this invention is to propose a simple catalyst preparation process which does not demand any washing and exchange steps.

A still further object of this invention is to propose a process for preparing FCC catalyst having higher activity and properties to reduce coke and bottom yields.

Yet a further object is to propose a process for preparing FCC catalyst for improving gasoline and TCO yields.

DESCRIPTION OF THE INVENTION

According to this invention there is provided a process for the preparation of FCC catalyst comprising in the steps of preparing an aqueous alumina binder by peptising pseudo-boehmite alumina with formic acid and mixing with ammonium polysilicate, aluminum depleted and normal kaolin clays and silicon stabilized rare earth exchanged zeolite to obtain a slurry, subjecting said slurry to a step of thorough mixing and spray drying to obtain microspheroidal particles, and then subjecting the particles to a step of calcination.

The process for the preparation of aluminum depleted kaolin clay comprises in the steps of mixing calcined kaolin clay with an acid such as hydrochloric acid at temperatures from ambient to 90° C. and subjecting the mixture to a step of aging for a period of 4–60 hours. The surface area of the said aluminum depleted kaolin clay will typically range from about 60–140 $m^2/g$, with preferred surface area of about 80–120 $m^2/g$. The acid does not exclude use of other acids such as nitric acid, sulfuric acid, phosphoric acid, formic acid etc.

The zeolite component present in the catalyst composite is in the range of 5–35 wt %, a preferred range being from 15–30 wt %. The aluminum depleted kaolin clay is present in the range of 5–50 wt % preferred range being 15–45 wt %. The binder comprises alumina and present in the range of 10–40 wt %, a preferred range being 20–30 wt %. Kaolin clay is present in the range of 0–60 wt %, the preferred range being 0–45 wt %. The residual soda level in the finished catalyst is in the range of 0.2–0.7 wt %, preferred range being 0.3–0.5 wt %. The rare earth oxide content in the catalyst is in the range of 0.5–2 wt %, the preferred range being 0.8–1.2 wt %. The rare earth metal salts employed can either be the salt of a single rare earth metal or mixture of rare earth metals, such as chlorides consisting essentially of lanthanum, cerium, neodymium with minor amounts of samarium, gadolinium and yttrium.

Various factors contribute to provide a reduction in coke and bottom yields and improving gasoline and TCO yields. One such factor is that of the zeolite. In accordance with this invention, the zeolite employed in the catalyst is prepared from Na Y having a silicon content of 78 to 83 wt % and subjected to an ammonium exchange treatment with an ammonium solution, such as ammonium sulfate, to obtain Na $NH_4Y$ having a soda level of 1 to 3% by weight of zeolite. Such a Na $NH_4Y$ zeolite is then treated with ammonium hexafluoro silicate in presence of ammonium acetate to obtain silicon enriched Na $NH_4Y$, which is then dispersed in a rare earth solution to obtain silicon enriched Na $NH_4ReY$ having a silicon content of 84 to 90 wt %.

Another aspect of the present invention resides in the aluminum depleted kaolin clay employed in the catalyst. The aluminum depleted kaolin clay should have a surface area of 85 to 125 $m^2/g$ and average pore diameter of 80 to 120 Å. It has been found that such a surface area and average pore size helps in reduction of bottom.

The aluminum depleted kaolin used in the catalyst of the present invention is treated at room temperature in comparison to elevated temperatures used in the prior art. Such a treatment at room temperatures provides a controlled and uniform pore size in comparison to that obtained by a treatment at elevated temperatures.

The invention is further illustrated by the following specific but non limiting examples.

EXAMPLE 1

This example illustrates the process for preparation of ammonium rare earth exchange Y zeolite. Hydrothermally stable, large crystallite sized NaY zeolite was taken as the starting zeolite. 400 gms of this zeolite having surface area 772 $m^2/g$, crystallite size 1800 Å, crystallinity 102%, unit cell size (UCS) 24.65 Å was exchanged with 5% ammonium sulfate solution, maintaining solid: liquid ratio 1:10, temperature 90° C., for 45 minutes. The exchange step was repeated 4 more times each time with freshly prepared ammonium sulfate solution. The exchanged zeolite was filtered and adequately washed to remove sulfate ions and dried at 110° C. for 16 hours. The ammonium Y zeolite thus obtained had residual soda of 1.6 wt %. The zeolite had crystallinity of 101%, UCS 24.69 Å and crystallite size 1800 Å. The zeolite after oven drying at 110° C. for 16 hours was further exchanged three times with freshly prepared 5 wt % ammonium sulfate solution. The residual soda in the zeolite was 1.2 wt %. It was then dispersed in 1 wt % rare earth chloride solution, maintaining solid-liquid ratio of 1:10 at a temperature of 60° C. After exchanging for 20 minutes, zeolite was washed to free from chloride ions and dried at 110° C. for 16 hours to obtain rare earth exchanged ammonium Y zeolite.

EXAMPLE 2

This example illustrates the process for preparation of silicon enriched rare earth exchanged Y zeolite.

300 gm. of ammonium Y zeolite prepared as per the process of example 1 with residual soda of 1.6 wt %, was dispersed in 25 wt % ammonium acetate solution and kept under agitation, maintaining a temperature of 92° C. A solution prepared by dissolving 82 gm of ammonium hexafluoro silicate crystals dissolved in 750 gm of DM water was added to the above prepared ammonium Y-ammonium acetate slurry at the rate 1.5–2 ml/min. The addition was completed in about 7 hours. The zeolite thus produced was silicon stabilised. It was filtered, washed four times with hot DM water and dispersed in 1% rare earth chloride and rare earth was loaded with procedure similar to that explained in example 1. The silicon stabilised rare earth exchanged zeolite had crystallinity 95%, UCS 24.55 Å, surface area 670 $m^2/g$ and rare earth oxide content 4 wt %.

EXAMPLE 3

This example describes the process for preparation of aluminum depleted kaolin clay from calcined kaolin clay (BCK grade, M/S English India, Trivandrum, India), suitable for incorporation in FCC catalyst formulation.

68 gm hydrochloric acid (37% concentration, LR grade, SD Fine Chemicals, India) was diluted with 150 gm of DM water. To this dilute acid was added 50 gm calcined (at 900° C. for one hour) normal kaolin clay having particle size more than 80% in the range of 0.3–0.8 microns, and the mixture was kept under stirring under controlled conditions. This treatment of clay treated with acid was continued for 40 hours at room temperature. At the end, the aluminum depicted kaolin clay was recovered by filtration, washed repeatedly with DM water till free from chloride and dried at 110° C. for 16 hours. The modified kaolin clay thus produced is ready for use in FCC catalyst formulation and is characterised by the following properties.

| | |
|---|---|
| Surface area, $m^2/g$ | 96 |
| Average pore diameter, Å | 90 |
| Loss on ignition 900° C./1 hour, wt % | 8.5 |

EXAMPLE 4

This example describes the process for preparation of FCC catalyst using rare earth exchanged ammonium Y zeolite prepared as per example 1, ammonium polysilicate (M/S Bee Chems, Kanpur, India), pseudoboehmite alumina (Disperal S, M/S Condea Chemie, Germany) and kaolin clay. A slurry with pH of 3.5 and solid content 28 wt %, having the following composition was prepared: zeolite 25 wt %, alumina 30 wt %, kaolin clay 40 wt % and silica 5 wt %.

214 gm of pseudoboehmite alumina (30 wt % moisture) was peptised with 17.25 gm of formic acid (85% concentration, LR grade, SD Fine Chemicals, India). To the peptised alumina 156.3 gm of ammonium polysilicate (16% $SiO_2$) and 253 gm of kaolin clay (15% moisture were added. Adequate quantity of water was added to maintain the required solid concentration. 166.5 gm ammonium Y zeolite (25% volatile material), made into a fine paste by milling with 170 gm DM water was added to the mixture. The final slurry was milled thoroughly and spray dried at inlet temperature of 330° C., outlet temperature of 140° C. with feed rate of 100 gm/minute. The spray dried microspheres were calcined at 500° C. for one hour to obtain final FCC catalyst. The catalyst was subjected to hydrothermal deactivation at 788° C. for 3 hours with 100% steam.

Using Indian Oil's (IOC) standard feed with properties shown in table 1, micro activity test (MAT) was conducted under ASTM conditions. The test results are given in table 2. Here 216- conversion is defined as yield weight percent fraction boiling below 216° C.

TABLE 1

Properties of IOC standard MAT feed

| Wt % | BP °C. |
|---|---|
| IBP | 315 |
| 5 | 327 |
| 10 | 334 |
| 20 | 346 |
| 30 | 356 |
| 40 | 365 |
| 50 | 375 |
| 60 | 386 |
| 70 | 399 |
| 80 | 415 |
| 90 | 440 |
| 95 | 463 |
| FBP | 528 |
| Pour Point °C. | 36 |
| Density at 15° C. (g/ml) | 0.8677 |
| CCR (wt %) | 0.008 |
| RCR (wt %) | 0.04 |

TABLE 2

ASTM MAT test results

| Component (wt %) | Example 4 | Example 5 |
|---|---|---|
| 216-conversion | 54.76 | 69.80 |
| Hydrogen | 0.014 | 0.02 |
| Dry gas | 0.37 | 0.76 |
| LPG | 15.92 | 19.75 |
| Gasoline | 28.34 | 34.85 |
| Heavy Naphtha | 8.50 | 12.26 |
| LCO | 31.26 | 24.52 |
| TCO | 39.76 | 36.78 |
| Bottom, (370+) | 14.00 | 5.68 |
| Coke | 1.62 | 2.16 |

EXAMPLE 5

This example illustrates a process of preparing FCC catalyst as per example 4 with the exception that, in place of ammonium Y zeolite, silicon stabilized rare earth exchanged Y zeolite prepared under example 2 is used. The catalyst was calcined and steam deactivated and tested for ASTM MAT activity under conditions similar to those of example 4. The ASTM MAT test results are given in table 2, where the results are compared with catalyst of example 4. Example 5 catalyst shows higher activity, which is due to latter containing hydrothermally more stable silica stabilised zeolite. Further the catalyst of example 5 was subjected to microactivity test at different catalyst to oil ratios (W/F) using a commercial FCC feedstock, with properties as shown in table 3. The results are given in table 4.

TABLE 3

Properties of commercial FCCU feedstock.

| Wt % | BP °C. |
|---|---|
| IBP | 310 |
| 5 | 368 |

TABLE 3-continued

Properties of commercial FCCU feedstock.

| Wt % | BP °C. |
|---|---|
| 10 | 392 |
| 20 | 410 |
| 30 | 421 |
| 40 | 451 |
| 50 | 462 |
| 60 | 470 |
| 70 | 475 |
| 80 | 477 |
| 90 | 503 |
| 95 | 532 |
| FBP | 548 |
| Density, at 15° C. (g/ml) | 0.927 |
| RCR (wt %) | 0.353 |
| Paraffins (wt %) | 43.94 |
| Naphthenes (wt %) | 16.66 |
| Aromatics (wt %) | 39.40 |
| Nitrogen ppm | |
| Basic | 437 |
| Total | 1207 |

EXAMPLE 6

This example illustrates a method for preparation of fluid cracking catalyst as per the process of this invention, using silicon stabilized rare earth exchanged Y zeolite, aluminum depleted kaolin clay, prepared as per the process of example 3, normal kaolin clay, alumina and ammonium polysilicate. A slurry with final pH 3.4 and solid content 28% having the following composition (in wt %) was prepared zeolite (25), alumina (30), aluminum depleted kaolin clay (20), normal kaolin clay (20), and silica (5). 214.3 gm of alumina was peptized with 17.25 gm of formic acid. To the peptized alumina 156.3 gm of ammonium polysilicate and 117.65 gm normal kaolin clay were added, followed by addition of 109.9 gm of aluminum depleted kaolin clay in 100 gm of DM water. 140.5 gm of silicon stabilized rare earth exchanged Y zeolite in 200 gm DM water was ground into fine paste and added to the normal kaolin clay-alumina slurry. The final slurry was spray dried.

The microspheres were calcined and steam deactivated under conditions similar to those of example 4. The catalyst was then subjected to microactivity test at different catalyst to oil ratios (W/F). The results are shown in table 4(c) and compared with those of commercial catalyst 'A' (table 4a) and catalyst made as per example 5 (table 4b). It is seen from the data that catalyst made as per the process of our invention in example 6, is highly selective for improved bottom upgradation, it produces less coke and higher gasoline and TCO yields at comparable reaction parameters.

TABLE 4

MAT data of different catalysts (a) Catalyst: commercial catalyst A

| W/F, Min | 0.450 | 0.550 | 0.673 | 0.885 |
|---|---|---|---|---|
| Yields in wt % | 35.93 | 42.27 | 50.76 | 56.10 |
| 216-(conversion) | | | | |
| H$_2$ | 0.015 | 0.027 | 0.031 | 0.037 |
| Dry Gas | 0.48 | 0.57 | 0.78 | 0.87 |
| LPG | 7.27 | 9.15 | 11.04 | 12.85 |
| Gasoline | 17.74 | 20.94 | 25.67 | 29.02 |

TABLE 4-continued

MAT data of different catalysts

| Heavy Naphtha | 9.29 | 10.30 | 11.48 | 11.20 |
|---|---|---|---|---|
| Light Cycle Oil | 26.91 | 26.81 | 26.80 | 25.15 |
| Total Cycle Oil | 36.20 | 37.11 | 38.28 | 36.35 |
| Bottom (370+) | 37.18 | 30.92 | 22.44 | 18.74 |
| Coke | 1.11 | 1.28 | 1.76 | 2.13 |
| (b) Catalyst: example 5 | | | | |
| W/F, Min | 0.419 | 0.558 | 0.688 | |
| Conversion, wt % | 35.64 | 41.32 | 49.08 | |
| Yields in wt % 216- | | | | |
| $H_2$ | 0.017 | 0.021 | 0.027 | |
| Dry Gas | 0.60 | 0.65 | 0.77 | |
| LPG | 6.51 | 7.74 | 9.40 | |
| Gasoline | 17.73 | 20.87 | 24.86 | |
| Heavy Naphtha | 9.46 | 10.51 | 12.10 | |
| Light Cycle Oil | 29.34 | 29.35 | 29.77 | |
| Total Cycle Oil | 38.80 | 39.86 | 41.87 | |
| Bottom (370+) | 35.04 | 29.32 | 21.15 | |
| Coke | 1.32 | 1.53 | 1.92 | |
| (c) Catalyst: example 6 | | | | |
| W/F, Min | 0.446 | 0.558 | 0.693 | 0.873 |
| Yields, wt % | 37.65 | 45.05 | 51.86 | 58.32 |
| 216-(conversion) | | | | |
| $H_2$ | 0.019 | 0.021 | 0.024 | 0.028 |
| Dry Gas | 0.52 | 0.61 | 0.73 | 0.84 |
| LPG | 6.87 | 8.56 | 10.00 | 11.33 |
| Gasoline | 18.58 | 22.83 | 27.27 | 30.89 |
| Heavy Naphtha | 10.50 | 11.64 | 12.16 | 13.21 |
| Light Cycle Oil | 30.43 | 29.49 | 29.80 | 27.84 |
| Total Cycle Oil | 40.93 | 41.13 | 41.96 | 41.05 |
| Bottom (370+) | 31.91 | 25.44 | 18.34 | 13.82 |
| Coke | 1.16 | 1.39 | 1.68 | 2.02 |

W/F = Weight of catalyst in gm/feed injected in gm/min

EXAMPLE 7

This example demonstrates metal resistance property of catalyst prepared as per the process of this invention. The catalyst prepared as per example 6 and the commercial catalyst 'A' were doped with 2000 PPM Vanadium and 1500 PPM Nickel. The samples were calcined at 500° C. prior to metal doping. Metal doped catalysts were steam deactivated at 788° C./3 hr, 100% steam and evaluated under ASTM MAT conditions. The performance data of these two catalysts are given in table 5. The data shows that the catalyst of example 6 prepared as per the process of our invention has improved metal resistance properties as seen from reduced drop in conversion.

TABLE 5

Metal tolerance of catalyst under example 6 and commercial catalyst A
(Vanadium: 2000 PPM + Nickel: 1500 PPM)

| | Catalyst of example 6 | | Catalyst 'A', commercial | |
|---|---|---|---|---|
| | without metal | with metal | without metal | with metal |
| Conversion, % | 69.80 | 67.71 | 70.0 | 67.30 |
| Yields, wt % | | | | |
| $H_2$ | 0.02 | 0.03 | 0.009 | 0.043 |
| DG | 0.76 | 0.80 | 0.49 | 0.52 |
| LPG | 19.75 | 19.68 | 18.94 | 18.50 |
| Gasoline | 34.85 | 33.41 | 36.73 | 34.52 |
| TCO | 36.78 | 37.12 | 36.94 | 37.61 |
| 370+ | 5.68 | 6.70 | 5.14 | 6.90 |
| Coke | 2.16 | 2.26 | 1.76 | 2.14 |

TABLE 5-continued

Metal tolerance of catalyst under example 6 and commercial catalyst A
(Vanadium: 2000 PPM + Nickel: 1500 PPM)

| | Catalyst of example 6 | | Catalyst 'A', commercial | |
|---|---|---|---|---|
| | without metal | with metal | without metal | with metal |
| Drop in conversion % | | 2.99 | | 3.86 |

What is claimed is:

1. A fluidized catalytic cracking (FCC) catalyst comprising 5 to 35 by wt % of silicon enriched NaNH$_4$ReY zeolite having a silica content of 84 to 90 wt % of said zeolite and a soda content of 1 to 3 wt % of said zeolite, 5 to 50 wt % of aluminum-depleted kaolin clay leached with an acid and having a surface area of 85 to 125 m$^2$/g and an average pore diameter of 80 to 120 Å, 10 to 40 wt % of an alumina binder comprising formic acid peptized alumina and ammonium polysilicate, and 0 to 60 wt % of normal kaolin clay, wherein said FCC catalyst has a rare earth oxide content of 0.5 to 2 wt %.

2. A fluidized catalytic cracking catalyst as claimed in claim 1 comprising 15 to 30 wt % of said silicon enriched NaNH$_4$ReY zeolite, 15 to 45 wt % of said aluminum-depleted kaolin clay, 20 to 30 wt % of said alumina binder, and 0 to 45 wt % of normal kaolin clay, wherein said FCC catalyst has 0.8 to 1.2 wt % of a rare earth oxide.

3. A fluidized catalyst cracking catalyst as claimed in claim 2 wherein said alumina binder comprises pseudoboehmite alumina.

4. A fluidized catalytic cracking catalyst as claimed in claim 1 wherein said aluminum-depleted kaolin is prepared by leaching calcined kaolin with hydrochloric acid at temperature from ambient to 90° C. and subjecting said mixture to aging for 4 to 60 hours.

5. A fluidized catalytic cracking catalyst as claimed in claim 1 wherein said formic acid peptized alumina is pseudoboehmite alumina peptized with formic acid.

6. A fluidized catalytic cracking catalyst as claimed in claim 1 wherein said silicon enriched NaNH$_4$ReY zeolite has 1.0 to 5.7 wt % of rare earth oxide.

7. A process for preparing FCC catalyst suitable for hydrocarbon conversion comprising the steps of preparing an aqueous slurry of an alumina binder comprising an alumina peptized with formic acid and mixed with ammonium polysilicate, aluminum-depleted kaolin clay, having a surface area of 85 to 125 m$^2$/g and an average pore diameter of 80 to 120 Å, optionally normal kaolin clay, and silicon enriched rare earth exchanged zeolite having a silica content of 84–90 wt % and a soda content of 1 to 3 wt %, and subjecting said slurry to spray drying to obtain spherical particles, and subjecting said particles to calcination.

8. A process as claimed in claim 7, wherein said silicon enriched rare earth exchanged zeolite is prepared by the steps of subjecting a hydrothermally stable NaY having a silicon content of 78 to 83% to an ammonium exchange treatment with an ammonium solution to obtain NaNH$_4$Y zeolite, treating said NaNH$_4$Y zeolite with ammonium hexafluoro silicate and ammonium acetate to obtain silicon enriched NaNH$_4$Y zeolite, and dispersing said silicon enriched zeolite in a rare earth solution to obtain silicon enriched NaNH$_4$ReY zeolite, wherein said silicon enriched rare earth exchanged zeolite has a silicon content of 84 to 90 wt % and a soda level of 1 to 3 wt %.

9. A process for preparing FCC catalyst as claimed in claim 8 wherein said aluminum-depleted kaolin clay is obtained by the steps of leaching calcined kaolin with hydrochloric acid at temperature form ambient to 90° C. and subjecting said mixture to aging for 4 to 60 hours.

10. A process as claimed in claim 7 wherein the zeolite is exchanged with rare earth chloride solution to obtain 1.0–5.7 wt % of rare earth oxide.

11. A process as claimed in claim 7 wherein aluminum depleted kaolin clay is prepared by acid treatment of calcined normal kaolin clay at temperature from ambient to 90° C. for a period of 4–60 hours.

12. A process for preparing FCC catalyst as claimed in claim 11 wherein hydrochloric acid is used for said acid treatment.

13. A process as claimed in claim 7 wherein the content of the aluminum-depleted kaolin clay in between 5 to 50 wt % and normal clay is between 0 to 60 wt %.

14. A process as claimed in claim 7 wherein the weight percentage of the zeolite in the final catalyst composite material is in the range of 5 to 35 wt %.

* * * * *